US011577725B2

(12) United States Patent
Zwicky et al.

(10) Patent No.: US 11,577,725 B2
(45) Date of Patent: Feb. 14, 2023

(54) VEHICLE SPEED AND STEERING CONTROL

(71) Applicant: Ford Global Technologies, LLC, Dearborn, MI (US)

(72) Inventors: Timothy D. Zwicky, Dearborn, MI (US); Jeremy Lerner, Southfield, MI (US); Md Nahid Pervez, Palo Alto, CA (US); Natalie Arguello, Berkley, MI (US); Andrea Bowes Chowanic, West Bloomfield, MI (US); Scott Huggins, Novi, MI (US); Jason Joseph Woo, Northville, MI (US); Taylor Hawley, Dearborn, MI (US); Xingping Chen, Troy, MI (US); Nitendra Nath, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 17/009,872

(22) Filed: Sep. 2, 2020

(65) Prior Publication Data

US 2022/0063620 A1   Mar. 3, 2022

(51) Int. Cl.
| | |
|---|---|
| *B60W 30/16* | (2020.01) |
| *B60W 30/10* | (2006.01) |
| *B60W 50/08* | (2020.01) |
| *B60W 50/14* | (2020.01) |
| *B60W 50/00* | (2006.01) |

(52) U.S. Cl.
CPC ......... *B60W 30/162* (2013.01); *B60W 30/10* (2013.01); *B60W 50/085* (2013.01); *B60W 50/14* (2013.01); *B60W 2050/0072* (2013.01)

(58) Field of Classification Search
CPC .. B60W 30/162; B60W 30/10; B60W 50/085; B60W 50/14; B60W 2050/0072
See application file for complete search history.

(56) References Cited

U.S. PATENT DOCUMENTS

| | | |
|---|---|---|
| 10,358,129 B2 | 7/2019 | Payne et al. |
| 2015/0120124 A1* | 4/2015 | Bartels .................. B60W 50/10 701/23 |

(Continued)

FOREIGN PATENT DOCUMENTS

| | | |
|---|---|---|
| DE | 102017205893 A1 | 10/2017 |
| WO | 2018114665 A1 | 6/2018 |

*Primary Examiner* — Yazan A Soofi
*Assistant Examiner* — Naeem Taslim Alam
(74) *Attorney, Agent, or Firm* — Frank A. MacKenzie; Bejin Bieneman PLC

(57) ABSTRACT

A system includes a processor and a memory storing instructions executable by the processor to control at least one of a steering system or a propulsion system to operate a vehicle at a speed below a speed threshold. The instructions include instructions to determine whether one or more second vehicles a first distance from the vehicle are traveling below the speed threshold. The instructions include instructions to, upon determining the second vehicles are traveling below the speed threshold, continue to control the steering system or the propulsion system. The instructions include instructions to, upon determining the second vehicles are not traveling below the speed threshold, transition control of the steering system or the propulsion system to a human operator of the vehicle.

20 Claims, 3 Drawing Sheets

(56) References Cited

U.S. PATENT DOCUMENTS

| | | | |
|---|---|---|---|
| 2020/0079394 A1* | 3/2020 | Masuda | B60W 60/00186 |
| 2020/0180661 A1* | 6/2020 | Honda | B60W 60/0054 |
| 2020/0290612 A1* | 9/2020 | Yamaguchi | B60W 40/06 |
| 2021/0046822 A1* | 2/2021 | Kleen | B60W 50/14 |
| 2022/0032908 A1* | 2/2022 | Matsumoto | B60W 30/18163 |

* cited by examiner

VEHICLE SPEED AND STEERING CONTROL

BACKGROUND

Vehicles can be equipped with computers, networks, sensors and controllers to acquire data regarding the vehicle's environment and/or to operate vehicle components. Vehicle sensors can provide data about the vehicle's environment, e.g., concerning routes to be traveled and objects to be avoided in the vehicle's environment. Further, vehicles can receive data from one or more external sources, e.g., a central server, a sensor mounted to infrastructure, etc.

DETAILED DESCRIPTION

Figure 1:
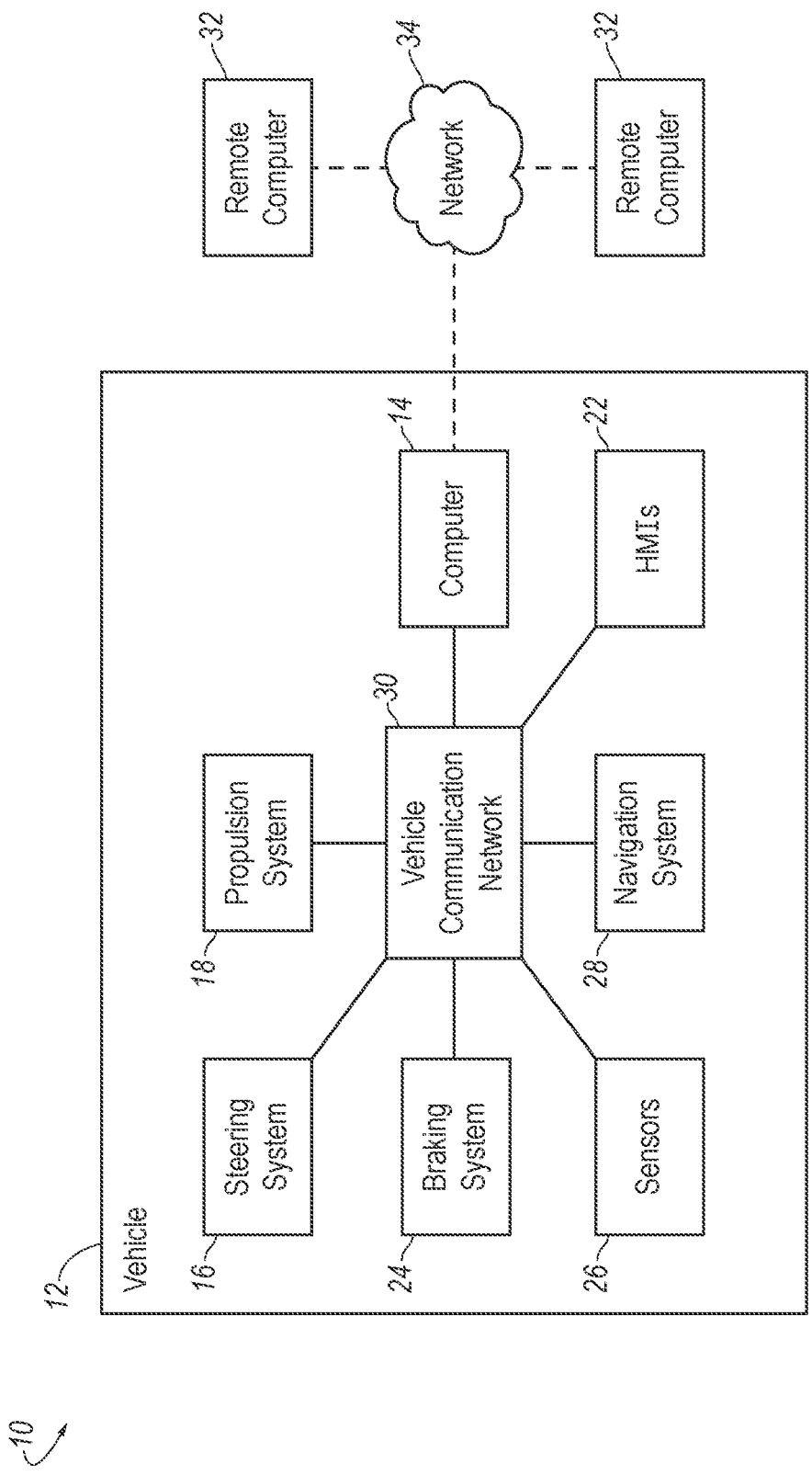
FIG. 1 is a block diagram of components of a vehicle control system.

A system includes a processor and a memory storing instructions executable by the processor to control at least one of a steering system or a propulsion system to operate a vehicle at a speed below a speed threshold. The instructions include instructions to determine whether one or more second vehicles a first distance from the vehicle are traveling below the speed threshold. The instructions include instructions to, upon determining the second vehicles are traveling below the speed threshold, continue to control the steering system or the propulsion system. The instructions include instructions to, upon determining the second vehicles are not traveling below the speed threshold, transition control of the steering system or the propulsion system to a human operator of the vehicle.

The instructions may include instructions to, upon determining one or more third vehicles a second distance less than the first distance from the vehicle are not traveling below the speed threshold, control the steering system or the propulsion system to operate the vehicle at a speed above the speed threshold.

The instructions may include instructions to, upon determining the speed of the vehicle has been above the speed threshold for a specified amount of time, transition control of the steering system or the propulsion system to the human operator of the vehicle.

The second distance may include a tolerance range.

The instructions may include instructions to determine whether the one or more second vehicles the first distance from the vehicle are traveling below the speed threshold based on an average speed of a plurality of the second vehicles.

The instructions may include instructions to determine that a third vehicle in front of the vehicle is traveling above the speed threshold before determining whether the second vehicle the first distance from the vehicle is traveling below the speed threshold.

The instructions include may instructions to determine that a third vehicle in front of the vehicle is out of a path of the vehicle before determining whether the second vehicle the first distance from the vehicle is traveling below the speed threshold.

The instructions may include instructions to determine whether the second vehicle the first distance from the vehicle is traveling below the speed threshold based on stored historical data.

The instructions may include instructions to determine whether the second vehicle the first distance from the vehicle is traveling below the speed threshold based on data received from a computer remote from the vehicle.

The system may include the propulsion system or the steering system.

The first distance may include a tolerance range.

The speed threshold may be less than a speed limit of a road on which the vehicle is operating.

The instructions may include instructions to determine whether the speed one or more second vehicles the first distance from the vehicle and in a same lane as the vehicle are traveling below the speed threshold.

A method includes controlling, with a computer having a processor and a memory, at least one of a propulsion system or a steering system to operate a vehicle at a speed below a speed threshold. The method includes determining whether a second vehicle a first distance from the vehicle is traveling below the speed threshold. The method incudes, upon determining the second vehicle is traveling below the speed threshold, continuing control of the steering system or the propulsion system with the computer. The method includes, upon determining the second vehicle is not traveling below the speed threshold, transitioning control of the steering system or the propulsion system to a human operator of the vehicle.

The method may include, upon determining a third vehicle a second distance less than the first distance from the vehicle is not traveling below the speed threshold, controlling, with the computer, the steering system or the propulsion system to operate the vehicle at a speed above the speed threshold.

The second distance may include a tolerance range.

The method may include, upon determining the speed of the vehicle has been above the speed threshold for a specified amount of time, transitioning control of the steering system of the propulsion system of the human operator of the vehicle.

The first distance may include a tolerance range.

The method may include determining that a third vehicle in front of the vehicle is traveling above the speed threshold before determining whether the second vehicle the first distance from the vehicle is traveling below the speed threshold.

The method may include determining that a third vehicle in front of the vehicle is out of a path of the vehicle before determining whether the second vehicle the first distance from the vehicle is traveling below the speed threshold.

The method may include determining whether the second vehicle the first distance from the vehicle is traveling below the speed threshold based on stored historical data.

The method may include determining whether the second vehicle the first distance from the vehicle is traveling below the speed threshold based on data received from a computer remote from the vehicle.

Figure 2:
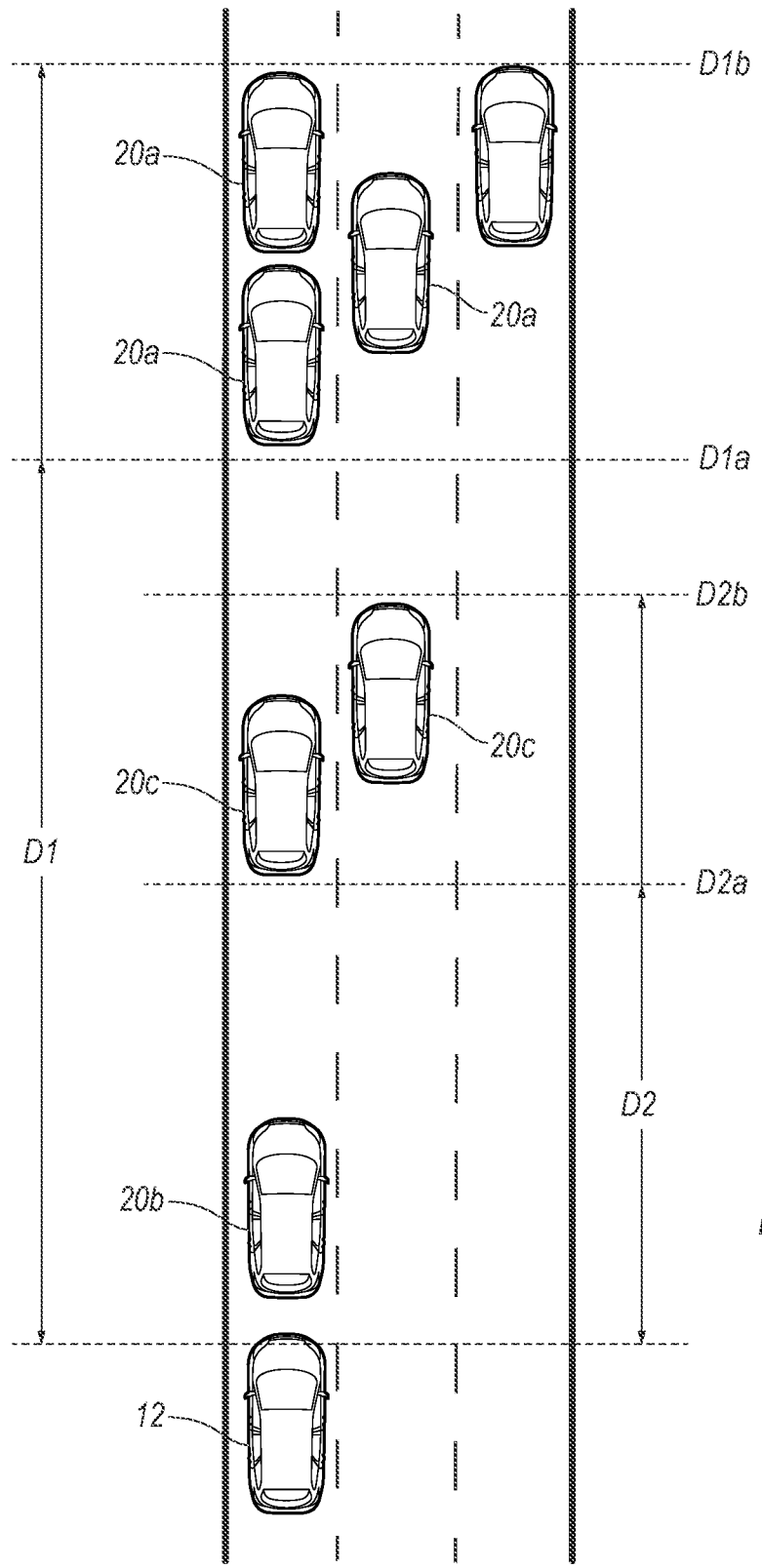
FIG. 2 is an illustration of a traffic scene including a host vehicle and other vehicles.

With reference to FIGS. 1 and 2, wherein like numerals indicate like parts throughout the several views, a system 10 for controlling operation of a vehicle 12 includes a computer 14 having a processor and a memory. The memory stores instructions executable by the processor to control at least one of a steering system 16 or a propulsion system 18 to operate the vehicle 12 at a speed below a speed threshold. The instructions include instructions to determine whether a second vehicle 20a that is a first distance D1 from the vehicle 12 is traveling below the speed threshold. The instructions include instructions to, upon determining the second vehicle 20a is traveling below the speed threshold, continue to control the steering system 16 and/or the propulsion system 18, and, upon determining the second vehicle 20a is not traveling below the speed threshold, transition control of the steering system 16 and/or propulsion system 18 to a human operator of the vehicle 12.

Frequent transition of control of the steering system 16 and/or the propulsion system 18 between the computer 14 and the human operator may be uncomfortable and/or undesirable for the human operator and/or other occupants of the vehicle 12. The system 10 advantageously provides a reduced number of transitions by selectively operating the vehicle 12 above and below the speed threshold, and transitioning control between the computer 14 and the human operator, based on the speed of one or more second vehicles 20a, 20b, 20c compared to the speed threshold.

The vehicle 12 may be any suitable type of ground vehicle, e.g., a passenger or commercial automobile such as a sedan, a coupe, a truck, a sport utility vehicle, a crossover vehicle, a van, a minivan, a taxi, a bus, etc.

The vehicle 12 may include one or more human-machine-interfaces (HMIs) 22. The HMIs 22 present data to and/or receive data from the human operator of the vehicle. The HMIs 22 may include dials, digital readouts, screens such as a touch-sensitive display screen, speakers, etc., for providing data to the occupant. The user interface may include one or more buttons, pedals, knobs, keypads, microphones, for receiving data from the occupant. The HMIs 22 may include a steering wheel, accelerator pedal, brake pedal, etc.

The computer 14 can be programmed to operate the vehicle 12 independently of the intervention of the human operator, completely or to a lesser degree. In other words, the vehicle 12 may be autonomously operated such that the vehicle 12 may be driven without constant attention from the human operator, i.e., the vehicle 12 may be self-driving without human input. The computer 14 may be programmed to operate the steering system 16, the propulsion system 18, a braking system 24, and/or other vehicle systems based at least in part on data received from sensors 26 of the vehicle 12. For the purposes of this disclosure, autonomous operation means the computer 14 controls the propulsion system 18, the braking system 24, and the steering system 16 without input from a human operator; semi-autonomous operation means the computer 14 controls one or two of the propulsion system 18, the braking system 24, and the steering system 16 and a human operator controls the remainder; and nonautonomous operation means a human operator controls the propulsion system 18, the braking system 24, and the steering system 16.

The steering system 16 controls the turning of the wheels toward a right or left of the vehicle 12 (i.e., with respect to a longitudinal axis of the vehicle). The steering system 16 is in communication with and receives input from the steering wheel (or other HMI 22) and/or the computer 14. The steering system 16 may include a rack-and-pinion system with electric power-assisted steering, a steer-by-wire system, or any other suitable system.

The propulsion system 18 controls spinning of the wheels by applying torque to maintain or increase the speed of the vehicle 12. The propulsion system 18 is in communication with and receives input from the accelerator pedal (or other HMI 22) and/or the computer 14. The propulsion system 18 may include one or more of an internal combustion engine, electric motor, hybrid engine, etc.

The braking system 24 resists the motion of the vehicle 12 to thereby slow and/or stop the vehicle 12. The braking system 24 may include friction brakes such as disc brakes, drum brakes, band brakes, and so on; regenerative brakes; any other suitable type of brakes; or a combination. The braking system 24 is in communication with and receives input from the computer 14 and/or the human operator. A human operator may control the braking system 24 via, e.g., the brake pedal (or other HMI).

The vehicle 12 includes a variety of sensors 26. Some sensors 26 detect internal states of the vehicle 12, for example, wheel speed, wheel orientation, and engine and transmission variables. Some sensors 26 detect the position or orientation of the vehicle 12, for example, global positioning system (GPS) sensors 26; accelerometers such as piezo-electric or microelectromechanical systems (MEMS); gyroscopes such as rate, ring laser, or fiber-optic gyroscopes; inertial measurements units (IMU); and magnetometers. Some sensors 26 detect the external world, for example, radar sensors 26, scanning laser range finders, light detection and ranging (LIDAR) devices, and image processing sensors 26 such as cameras. A LIDAR device detects distances to objects by emitting laser pulses and measuring the time of flight for the pulse to travel to the object and back. Some sensors 26 are communications devices, for example, vehicle-to-infrastructure (V2I) or vehicle-to-vehicle (V2V) devices. Sensor operation can be affected by obstructions, e.g., dust, snow, insects, etc.

The vehicle 12 may include a navigation system 28. The navigation system 28 is implemented via circuits, chips, or other electronic components that can determine a present location of the vehicle 12. The navigation system 28 may be implemented via a satellite-based system such as the Global Positioning System (GPS). The navigation system 28 may triangulate the location of the vehicle 12 based on signals received from various satellites in the Earth's orbit. The navigation system 28 is programmed to output signals representing the present location of the vehicle 12 to, e.g., the computer 14 via a vehicle communication network 30. In some instances, the navigation system 28 is programmed to determine a route from the present location of the vehicle 12 to a future location. The navigation system 28 may access a map stored in memory and develop the route according to the map data. The navigation system 28 may also send a request to a server to calculate a route to a future location and download such route from the server. The map in either case may include data specifying lanes of roads of the map, e.g., including turn lanes, a direction of traffic flow for the lanes, a speed limit, etc.

The computer 14 is a microprocessor-based controller implemented via circuits, chips, or other electronic components. The computer 14 includes a processor and a memory such as are known. The memory includes one or more forms of computer readable media, and stores instructions executable by the computer 14 for performing various operations, including as disclosed herein. The computer 14 of the vehicle 28 may be programmed to execute operations disclosed herein. Specifically, the memory stores instructions executable by the processor to execute the operations disclosed herein and electronically stores data and/or databases. electronically storing data and/or databases. For example, the computer may include one or more dedicated electronic circuit including an ASIC (Application Specific Integrated Circuit) that is manufactured for a particular operation. In another example, the computer 14 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. The computer 14 may be a set of computers communicating with one another.

The computer 14 is generally arranged for communications on the communication network 30 that can include a bus in the vehicle 12 such as a controller area network (CAN) or the like, and/or other wired and/or wireless mechanisms. Via the communication network 30, the computer 14 may transmit messages to various devices in the vehicle 12 and/or receive messages (e.g., CAN messages) from the various devices, e.g., the steering system 16, the propulsion system 18, the HMIs 22, the braking system 24, the sensors 26, the navigation system 28, etc. Alternatively or additionally, in cases where the computer 14 comprises a plurality of devices, the communication network 30 may be used for communications between devices represented as the computer 14 in this disclosure.

The computer 14 can communicate, typically via a wireless connection, with one or more remote computers 32 that are physically separate, and typically geographically remote, from the vehicle 12, such as a server computer, computers of second vehicles 20a, 20b, 20c, etc. The computer 14 may provide data to, and receive data from, the remote computers 32 via a network 34. The network 34 represents one or more mechanisms by which the computer 14 of the vehicle 12 may communicate with the remote computers 32. Accordingly, the network 34 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary networks 34 include wireless communication networks (e.g., using Bluetooth®, Bluetooth® Low Energy (BLE), IEEE 802.11, Dedicated Short Range Communications (DSRC), etc.), local area networks (LAN) and/or wide area networks (WAN), including the Internet, providing data communication services. The network 34 can be a vehicle-to-everything network (V2X), where "X" signifies an entity with which the computer 14 of the vehicle 12 can communicate, e.g., a vehicle (V2V), infrastructure (V2I), a pedestrian (V2P), etc. The computer 14 can communicate with one or more devices over the V2X network, e.g., with another vehicle, with a device mounted to infrastructure, to a user outside of the vehicle 12, etc. One example of a V2X network is a cellular-V2X (C-V2X) network. The C-V2X network is a band of frequencies dedicated to V2X communications, e.g., between vehicle, portable devices, etc. For example, the C-V2X network can include frequencies between 5.90 and 5.99 gigahertz (GHz) (e.g., 5.85-5.925 GHz).

The computer 14 is programmed to control the operation of one or more of the steering system 16, the propulsion system 18, and the braking system 24, e.g., in the autonomous or semi-autonomous mode and based on data from the sensors 26, the navigation system 28, one or more remote computers 32, etc. The computer 14 may determine whether and when the computer 14, as opposed to the human operator, is to control such operations. Additionally, the computer 14 may be programmed to determine whether and when the human operator is to control such operations. For example, the computer 14 may determine whether and when to operate the vehicle 12 in the autonomous mode, the semiautonomous mode, or the nonautonomous mode.

The computer 14 is programed to control the propulsion system 18 to operate the vehicle 12 at a speed (i.e., rate of movement with respect to a ground surface) below the speed threshold, e.g., below 50 kilometers per hour. For example, the computer 14 may command the propulsion system 18 via the communication network 30 to increase and maintain the speed of the vehicle 12 at speeds up to the speed threshold. The computer 14 may control the steering system 16 to operate the vehicle 12 below the speed threshold. For example, the computer 14 may command the steering system 16 via the communication network 30 to turn wheels of the vehicle 12 toward the left or right while the vehicle 12 is traveling below the speed threshold, e.g., to maintain the vehicle 12 within a lane of travel of the road. The computer 14 may control the braking system 24, e.g., by transmitting commands via the communication network 30 and specifying actuation of the braking system 24 to slow or stop the vehicle 12, e.g., avoid impact with an object in front of the vehicle 12.

The speed threshold provides operation of the vehicle 12 within nominal limits as based on regulations of the road on which the vehicle 12 is operating, as based on actual or anticipated traffic conditions, as based on capabilities of various vehicle components, etc. For example, the speed threshold may be less than a speed limit of the road on which the vehicle 12 is operating. The computer 14 may identify speed limit as specified in the map data of the navigation system 28. The computer 14 may identify the speed threshold as being a specified amount below the speed limit, e.g., 10 kilometers per hour less than the speed limit, 20 percent less that the speed limit, etc. As another example, the computer 14 may determine average speeds at a specified time or during a specified time period of one or more other vehicles proximate to the vehicle 12, i.e., within a specified distance or a distance that is within range of sensors 26, e.g., within 30 meters, and may identify the speed threshold as such average. The computer 14 may determine the speeds of the proximate vehicles based on data from the sensors 26, data from the proximate vehicles (e.g., remote computers 32 included therein), and/or other remote computers 32 via the network 34. As another example, the computer 14 may identify the speed threshold based on a historical speed of travel of vehicles on the road on which the vehicle 12 is operating, e.g., as specified in data from a remote computer 32 and based on a day of the week, time of day (further discussed below), etc. The speed threshold may be based on, e.g. equal to, the historical speed. In another example, the speed threshold may be a specified amount less than the historical speed, e.g., 5 kilometers per hour less than the historical speed, 5 percent less than the historical speed, etc. As another example, the speed threshold may be predetermined and stored in memory of the computer 14. The speed threshold may be predetermined based on capabilities of the sensors 26 or other vehicle 12 components, e.g., such that the computer 14 does not control the vehicle 12 to operate at a speed whereby the computer 14, vehicle sensors 26 and systems 16, 18, 24 cannot reliably operate, e.g., detect and/or respond to objects detected by the sensors 26 under typical operation. The capabilities of the computer 14, sensors 26, and systems 16, 18, 24 may be determined based on empirical testing and/or computer testing or simulation to provide a model that identifies how quickly objects may be detected and/or responded to.

The computer 14 may control the propulsion system 18 and the braking system 24 to maintain a specified distance behind the second vehicle 20b that is directly in front of, and in a same lane as, the vehicle 12. The specified distance may be predetermined and stored in memory, e.g., 5 meters. The specified distance may be provided by the human operator, e.g., via one of the HMIs 22. The computer 14 may determine the specified distance based on the speed of the vehicle 12, e.g., relatively greater distances at higher speeds and lesser distances at lower speeds and as specified in a lookup table or the like associating various speeds at which the vehicle 12 is to be operated with various specified distances, i.e., the specified distance can vary according to vehicle 12 speed.

The computer 14 may control the propulsion system 18, the steering system 16, and/or the braking system 24 to operate the vehicle 12 above the speed threshold, e.g., for a specified amount of time such as 15 seconds. The computer 14 may determine whether the vehicle 12 has been operated above the speed threshold for the specified amount of time by starting a clock or timer upon operating the vehicle 12 above speed threshold and compare an amount of elapsed time with the specified amount of time. The specified amount of time may be predetermined and stored in the memory of the computer 14. The specified amount of time may be predetermined based on capabilities of the sensors 26, e.g., an amount of time the sensors 26 may operate at an increased data collection rate (e.g., as compared to a data collection rate during typical operation) before overheating, based on capabilities of the computer 14, to process sensor data at a needed rate, etc. For example, the computer 14, when operating the vehicle 12 above the speed threshold, may require the increased data collection rate to compensate for a decreased amount of time to react to a detected object, an increased amount of time to stop the vehicle 12, etc., caused by operation above the speed threshold. Increasing the data collection rate of the sensors 26 (e.g., increasing a frame rate of a camera or a pulse rate of a Lidar) may provide earlier and more precise detection of objects than detection of objects with the data collection rate during typical operation (e.g., the data collection rate used below the speed threshold). In other words, the data collection rate during typical operation may be insufficient to operate the vehicle 12 above the speed threshold without colliding with an object. Operating the sensors 26 at the increased data collection rate for prolonged periods of time, e.g., for longer than the specified amount of time, may be constrained by limitations of the sensors 26. For example, an amount of time a Lidar may be operated at an increased pulse rate may be limited by dead time and quenching characteristics of diodes of the Lidar. As another example, an amount of time a camera may be operated at an increased frame rate may be limited by an amount and/or type of dynamic random access memory (DRAM) available to the camera.

The computer 14 is programed to determine speeds, e.g., as discussed below, of one or more of the second vehicles 20a, 20b, 20c, e.g., the second vehicle 20b directly in front of the vehicle 12, one or more second vehicles 20a at the first distance D1 from the vehicle 12, and one or more second vehicles 20c at a second distance D2 from the vehicle 12, where the second distance D2 is less than the first distance D1. The first distance D1 may have a specified tolerance, i.e., may be specified as a range of distances between a minimum distance D1a and a maximum distance D1b. For example, the first distance D1 may be 0.5 kilometers with a tolerance range of +/−0.1 kilometers. In such example, the first distance D1 would encompass distances between the minimum distance D1a of 0.4 kilometers and the maximum distance D1b of 0.6 kilometers. The second distance D2 may be specified with a tolerance range, e.g., a minimum distance D2a and a maximum distance D2b. For example, the second distance D2 may be 0.2 kilometers with a tolerance range of +/−0.1 kilometers. In such example, the second distance D2 would encompass distances between the minimum distance D2a of 0.1 kilometers and the maximum distance D2b of 0.3 kilometers.

The second vehicles 20a at the first distance D1, e.g., the second vehicles 20a between the minimum distance D1a and the maximum distance D1b, may limit a speed of the vehicle 12, e.g., when the second vehicles 20a are in a path of the vehicle 12 and a distance between the vehicle 12 and the second vehicles 20a is reduced below a threshold distance, e.g., 50 meters. The threshold distance may be such that the vehicle 12 maintains a minimum distance from the vehicle 20b directly in front of the vehicle 12. For example, when the second vehicles 20a are traveling below the speed threshold, the vehicle 12, when traveling above the speed threshold, may move closer to the second vehicles 20a, e.g., to within the threshold distance and within specified amount of time. Once the vehicle 12 is within the threshold distance of the second vehicles 20a traveling below the speed threshold, the vehicle 12 will also operate below the speed threshold. The distance D1 may be predetermined and stored in memory, may be determined based on the speed threshold, map data, etc. The first distance D1 may be determined to be a distance the vehicle 12 would travel at the threshold speed within a certain time, e.g., 6 second.

Second vehicles 20c at the second distance D2 are between the vehicles 20a at the first distance D1 and the vehicle 12. The second vehicles 20c at the second distance D2, e.g., between the minimum distance D2a and the maximum distance D2b, and traveling below the speed threshold may inhibit the vehicle 12 from coming with the threshold distance of the second vehicles 20a at the first distance D1. For example, the second vehicles 20c at the second distance D2 may be in the path of the vehicle 12 and be between the vehicle 12 and the second vehicles 20a at the first distance D1. The distance D2 may be predetermined and stored in memory, determined based on the first distance D1, map data, etc. The distance D2 may be determined to be a distance the vehicle 12 would travel at the threshold speed within a certain time, e.g., 3 seconds. The distance D2 may be a detection range of one or more of the sensors 26.

The computer 14 may determine speeds of the second vehicles 20a, 20b, 20c based on data from the sensors 26. For example, the computer 14 may detect a speed of the vehicle 12 relative to the road, e.g., with data from a wheel speed sensor. The computer 14 may also detect a speed of the second vehicle 20a, 20b, 20c relative to the vehicle 12, e.g., with data from a radar sensor, Lidar sensor, etc. The computer 12 may determine the speed of the second vehicle 20a, 20b, 20c by adding the detected speed of the vehicle 12 relative to the road to the detected speed of the second vehicle 20a, 20b, 20c relative to the vehicle 12. The computer 14 may determine speeds of the second vehicles 20a, 20b, 20c based on data from one or more remote computers 32. For example, remote computers 32 of the second vehicles 20a, 20b, 20c may transmit data specifying speeds of the second vehicles 20a, 20b, 20c to the vehicle 12. As another example, remote computers 32 connected to sensors supported by infrastructure (e.g., bridges, poles, etc.) and configured to detect speeds of the second vehicles 20a, 20b, 20c may transmit such detected speeds to the computer 14. As another example, one or more remote computers 32 may store historical speed data, i.e., data indicating average speeds of vehicles at certain positions along the road at various previous days and times, and may transmit such data to the computer 14. Historical speed data may be provided by a third party, such as historical speed data available at https://www.google.com/maps. The computer 14 may request such data, e.g., by sending a message specifying the position along the road, the day of the week, and the time of day to the remote computer 32.

The computer 14 may determine the speed of the second vehicles 20a, 20b, 20c as an average speed. For example, the computer 14 may determine a speed of each second vehicle 20a at the first distance D1 from the vehicle 12 and average such speeds by summing the speeds and dividing by a number of the second vehicles 20a at the first distance D1. As another example, the computer 14 may determine a speed of each second vehicle 20c at the second distance D2 from the vehicle 12 and average such speeds by summing the speeds and dividing by a number of the second vehicles 20c at the second distance D1. The computer 14 can determine the speeds of the second vehicles 20a, 20c as a percentage higher or lower than the average, e.g., 25% higher or lower. The computer 14 may determine the speed of the second vehicles 20a, 20c as a median speed of the respective second vehicles 20a, 20c. The computer 14 may determine the speeds at the first distance D1 and the second distance D2 as being a speed of the second vehicle 20a, 20c at the respective distance D1, D2 that is traveling the fastest or the slowest. The computer 14 may determine the speeds of the speeds of the second vehicles 20a, 20c and the respective distances D1, D2 based only on data indicates speeds of the second vehicles 20a, 20c in the same lane as the vehicle 12. The computer 12 may use other techniques to determine the speeds of the second vehicles 20a, 20b at the first distance D1 and the second distance D2.

The computer 14 is programed to determine whether one or more of the second vehicles 20a, 20b, 20c are traveling below or above the speed threshold. For example, the computer 14 may compare determined speeds of the second vehicles 20a, 20b, 20c with the speed threshold. The computer 14 determines one or more of the second vehicles 20a, 20b, 20c are traveling below (and not above) the speed threshold when the determined speeds of the second vehicles 20a, 20b, 20c are less than the speed threshold. The computer 14 determines one or more of the second vehicles 20a, 20b, 20c are traveling above (and not below) the speed threshold when the determined speeds of the second vehicles 20a, 20b, 20c are greater than the speed threshold. The computer 14 may determine whether one or more of the second vehicles 20, 20b, 20c in the same lane as the vehicle 12 are traveling below or above the speed threshold. In other words, the computer 14 may compare speeds of the second vehicles 20a, 20b, 20c in the same lane as the vehicle 12 with the speed threshold. The computer 14 may determine that the second vehicle 20b in front of the vehicle 12 is traveling above the speed threshold before determining whether one or more of the second vehicles 20a at the first distance D1 from the vehicle 12 are traveling below the speed threshold. In other words, the computer 14 may wait to determine whether the second vehicles 20a, 20b, 20c at the first distance D1 from the vehicle 12 are traveling below the speed threshold until after the computer 14 has determined that the second vehicle 20b is traveling above the speed threshold.

The computer 14 may determine a path of the vehicle 12. The path of the vehicle 12 is a trajectory, e.g., along the road, that the vehicle 12 is likely to travel. For example, the path may be along the lane in which the vehicle 12 is traveling. The computer 12 may determine the path based on data from the navigation system, e.g., map data, and based on data from the sensors 26 and remote computers 32, e.g., such that the vehicle 12 maintains position between lane markings, avoids objects, etc., when following the path.

The computer 14 may determine the path with a path planning algorithm. The path planning algorithm is programming of the computer 14 that generates a path for the vehicle 12 as the vehicle 12 moves from an origin to a destination. The path planning algorithm can be stored in a memory of the computer 14. The path planning algorithm can be, e.g., a navigational algorithm that generates location coordinates for the vehicle over time. As an example, the path planning algorithm can determine the path with a path polynomial. The path polynomial is a model that predicts the path as a line traced by a polynomial equation. For example, a path polynomial p(y) is a model that predicts the path as a line traced by a polynomial equation. The path polynomial p(y) predicts the path for a predetermined upcoming distance y, by determining a longitudinal coordinate y, e.g., measured in meters:

$$p(y)=a_0+a_1y+a_2y^2+a_3y^3 \qquad (1)$$

where $a_0$ an offset, i.e., a lateral distance between the path and a center line of the host vehicle 12 at the upcoming distance y, $a_1$ is a heading angle of the path, $a_2$ is the curvature of the path, and $a_3$ is the curvature rate of the path. In the present context, the "upcoming distance" y is a predetermined longitudinal distance in front of the host vehicle 12 from a front bumper of the host vehicle 12 at which the sensors 26 collect data and the path planner predicts the path. The upcoming distance y can be determined based on, e.g., a current speed of the host vehicle 12, a predetermined time threshold, determined based on empirical simulation data, a detection range of the sensors 12, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle along the host vehicle path polynomial, where braking torque and powertrain torque are applied as positive and negative longitudinal accelerations and clockwise and counter clockwise steering torque are applied as left and right lateral accelerations.

By determining lateral and longitudinal accelerations to achieve predetermined target values within predetermined constraints within predetermined numbers of time periods, the vehicle 12 path polynomial can be constrained to provide a vehicle path polynomial can be operated upon by the computer 14 without exceeding limits on lateral and longitudinal accelerations.

The computer 14 may determine whether the second vehicle 20b in front of the vehicle 12 is out of the path of the vehicle 12. The second vehicle 20*b* is out of the path when there is no overlap between the path of the vehicle 12 (e.g., determined with the path polynomial) and the second vehicle 20*b*. The computer 12 may determine the second vehicle 20*b* in front of the vehicle 12 is out of the path based on data from the sensors 26 and/or the remote computers 32, e.g., indicating the second vehicle 20*b* has moved out of the lane in which the vehicle 12 is traveling, indicating the second vehicle 20*b* has turned off the road on which the vehicle 12 is traveling, that the vehicle 12 and the second vehicle 20*b* cannot impact regardless of a speed of the vehicle 12 as the vehicle 12 travels the path, etc. The computer 12 may determine the second vehicle 20*b* is not out of the path based on data from the sensors 26 and remote computers 32, e.g., indicating the second vehicle 20*b* is in the lane in which the vehicle 12 is traveling, the vehicle 12 could impact the second vehicle 20*b* as the vehicle 12 travels the path, that the second vehicle 20*b* overlaps the path, etc.

The computer 14 is programmed to transition control of the steering system 16 and/or the propulsion system 18 to the human operator of the vehicle 12, e.g., from the autonomous or semiautonomous mode to the nonautonomous mode based on sensor 26 data and/or input of a human operator. The computer 14 may transition control to the human operator by commanding actuation of the steering system 16 and/or the propulsion system 18 based on input from the human operator to one of the HMIs 22, e.g., based on input to the steering wheel, the accelerator pedal, or other HMI 22, and not based on data from the sensors 26. Additionally, the computer 14 may command repositioning of the steering wheel and the accelerator pedal, e.g., from stowed non-operable positions to deployed operable positions, and may further command a seat supporting the human operator to reposition, e.g., to rotate, tilt, or translate to a position at which the human operator can interact with the steering wheel and the accelerator pedal. The computer 14 may transition control of the steering system 16 and/or the propulsion system 18 to the human operator of the vehicle 12 at least upon determining the speed of the vehicle 12 has been above the speed threshold for the specified amount of time or upon determining one or more of the second vehicles 20*a*, 20*b*, 20*c* are not traveling below the speed threshold.

Figure 3:
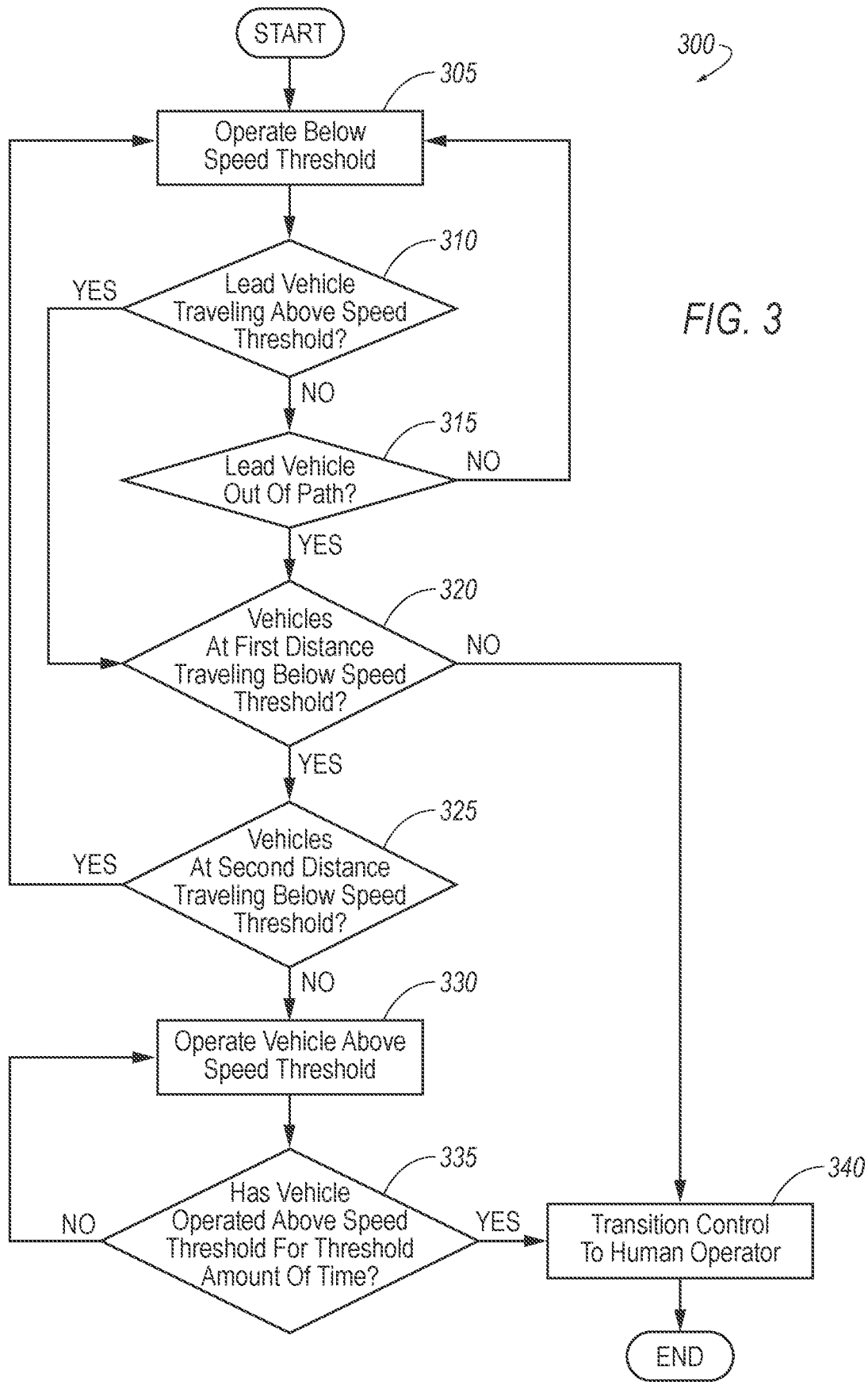
FIG. 3 in a flow chart illustrating a process for operating the vehicle.

FIG. 3 is a process flow diagram illustrating an exemplary process 300 for operating a vehicle 12 in the context of the system 10. The computer 14 may execute the process 300 when the vehicle 12 is traveling, e.g., moving along a road. The computer 14 receives data from the sensors 26, the remote computers 32, etc., throughout the process 300, e.g., via the vehicle 12 communication network 30 and from remote computers 32 via the network 34. The computer 14 may receive such data substantially continuously and/or at time intervals, e.g., every 50 milliseconds. The computer 14 may store the data, e.g., on the memory.

The process 300 begins at a block 305, wherein the computer 14 controls at least one of the steering system 16 and/or the propulsion system 18 to operate the vehicle 12 at a speed below the speed threshold. For example, the computer 14 may command the propulsion system 18 to increase and maintain the speed of the vehicle 12 up to the speed threshold and command the steering system 16 to turn wheels of the vehicle 12 to maintain the vehicle 12 within a lane of travel of the road, follows the path determined with the path polynomial, etc. The computer 14 may control the steering system 16 and/or the propulsion system 18 based on data received from sensors 26 and/or one or more remote computers 32. The computer 14 may command the vehicle 12 to follow the second vehicle 20*b* in front of the vehicle 12, e.g., to maintain a specified distance behind the second vehicle 20*b*.

Next, at a block 310, the computer 14 determines whether or not the second vehicle 20*b* in front of the vehicle 12 is traveling above the speed threshold. For example, the computer 12 may determine the speed of the second vehicle 20*b* based on data for the sensors 26 and/or one or more remote computers 32, and then may compare the speed of the second vehicle 20*b* with the speed threshold. Upon determining the second vehicle 20*b* is not traveling below the speed threshold the process 300 moves to a block 315. Upon determining the second vehicle 20*b* is traveling below the speed threshold the process 300 moves to a block 320.

At the block 315, the computer 14 determines whether or not the second vehicle 20*b* in front of the vehicle 12 is out of a path of the vehicle 12. The computer 12 may determine the second vehicle 20*b* is out of the path based on data from the sensors 26 and remote computers 32, e.g., indicating the second vehicle 20*b* has moved out of the lane in which the vehicle 12 is traveling, indicating the second vehicle 20*b* has turned off the road on which the vehicle 12 is traveling, etc. Upon determining the second vehicle 20*b* is out of the path the process 300 moves to the block 320. Upon determining the second vehicle 20*b* is not out of the path the process 300 returns to the block 305.

At the block 320, the computer 14 determines whether or not one or more second vehicles 20*a* the first distance D1 from the vehicle 12 are traveling below the speed threshold. The computer 14 may determine whether or not one or more second vehicles 20*a* the first distance D1 from the vehicle 12 and in the same lane as the vehicle 12 are traveling below the speed threshold. For example, the computer 12 may determine the speed of the second vehicles 20*a* based on data from the sensors 26 and/or one or more remote computers 32. The computer 12 may determine the speed as the average of the speeds of the second vehicles 20*a*. The computer 12 may determine the speed based on historical data. The computer 12 may compare the speed of the second vehicles 20*b* with the speed threshold. Upon determining the second vehicles 20*a* at the first distance D1 are traveling below the speed threshold the computer 14 continues to control the steering system 16 and/or the propulsion system 18 to operate the vehicle 12 below the speed threshold and the process 300 moves to a block 325. Upon determining the second vehicles 20*a* at the first distance D1 are not traveling below the speed threshold the process 300 moves to a block 340.

At the block 325, the computer 14 determines whether or not one or more second vehicles 20*c* the second distance D2 from the vehicle 12 are not traveling below the speed threshold. The computer 14 may determine whether or not one or more second vehicles 20*b* the second distance D2 from the vehicle 12 and in the same lane as the vehicle 12 are traveling below the speed threshold, e.g., as described for determining whether or not one or more second vehicles 20*a* are traveling below the speed threshold at the block 320. Upon determining the second vehicles 20*c* at the second distance D2 from the vehicle 12 are not traveling below the speed threshold the process 300 moves to a block 330. Upon determining the second vehicles 20*c* at the second distance D2 from the vehicle 12 are traveling below the speed threshold the computer 14 continues to control the steering system 16 and/or the propulsion system 18 to operate the vehicle 12 below the speed threshold and the process 300 returns to the block 305.

At the block 330 the computer 14 controls the steering system 16 and/or the propulsion system 18 to operate the vehicle 12 at a speed above the speed threshold, e.g., by commanding the steering system 16 and/or the propulsion system 18 based on data from the sensors 26 and/or one or more remote computers 32.

Next, at a block 335, the computer 14 determines whether the speed of the vehicle 12 has been above the speed threshold for a specified amount of time, e.g., with the internal clock and by comparing an amount of time the vehicle 12 is operated above the speed threshold with the specified time. Upon determining the speed of the vehicle 12 has not been above the speed threshold for the specified amount of time the computer 14 continues to operate the vehicle 12 above the speed threshold and the process 300 returns to the block 330. Upon determining the speed of the vehicle 12 has been above the speed threshold for the specified amount of time the process 300 moves to the block 340.

At the block 340, the computer 14 transitions control of the steering system 16 and/or the propulsion system 18 to the human operator of the vehicle 12. The computer 14 may transition control to the human operator by commanding actuation of the steering system 16 and/or the propulsion system 18 based on input from the human operator to one of the HMIs 22. Additionally, the computer 14 may command repositioning of the steering wheel and the accelerator pedal, and may further command the seat supporting the human operator to reposition. After the block 340, the process 300 may end. Alternately, the process 300 may return to the block 305.

With regard to the media, process 300, systems, methods, etc. described herein, it should be understood that, although the steps of such process 300, etc. have been described as occurring according to a certain ordered sequence, such process 300 could be practiced with the described steps performed in an order other than the order described herein. It further should be understood that certain steps could be performed simultaneously, that other steps could be added, or that certain steps described herein could be omitted. For example, in the process 300 described above, one or more of the steps could be omitted, or the steps could be executed in a different order than shown in the Figures. In other words, the descriptions of systems and/or processes herein are provided for the purpose of illustrating certain embodiments and should in no way be construed so as to limit the disclosed subject matter.

Computing devices, such as the computer 34, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

Use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a processor and a memory storing instructions executable by the processor to:
   control at least one of a steering system or a propulsion system to operate a vehicle at a speed below a speed threshold;
   determine whether one or more second vehicles a first distance from the vehicle are traveling below the speed threshold;
   upon determining that the one or more second vehicles are traveling below the speed threshold, continue to control the at least one of the steering system or the propulsion system; and
   upon determining that the one or more second vehicles are not traveling below the speed threshold, transition control of the steering system or the propulsion system to a human operator of the vehicle.

2. The system of claim 1, wherein the instructions include instructions to, upon determining that one or more third vehicles a second distance less than the first distance from the vehicle are not traveling below the speed threshold, control the steering system or the propulsion system to operate the vehicle at a speed above the speed threshold.

3. The system of claim 2, wherein the instructions include instructions to, upon determining that the speed of the vehicle has been above the speed threshold for a specified amount of time, transition control of the steering system or the propulsion system to the human operator of the vehicle.

4. The system of claim 2, wherein the second distance includes a tolerance range.

5. The system of claim 1, wherein the instructions include instructions to determine whether the one or more second vehicles the first distance from the vehicle are traveling below the speed threshold based on an average speed of a plurality of the one or more second vehicles.

6. The system of claim 1, wherein the instructions include instructions to determine that a third vehicle in front of the vehicle is traveling above the speed threshold before determining whether the one or more second vehicles the first distance from the vehicle are traveling below the speed threshold.

7. The system of claim 1, wherein the instructions include instructions to determine that a third vehicle in front of the vehicle is out of a path of the vehicle before determining whether the one or more second vehicles the first distance from the vehicle are traveling below the speed threshold.

8. The system of claim 1, wherein the instructions include instructions to determine whether the one or more second vehicles the first distance from the vehicle are traveling below the speed threshold based on stored historical data.

9. The system of claim 1, wherein the instructions include instructions to determine whether the one or more second vehicles the first distance from the vehicle are traveling below the speed threshold based on data received from a computer remote from the vehicle.

10. The system of claim 1, further comprising the propulsion system or the steering system.

11. The system of claim 1, wherein the first distance includes a tolerance range.

12. The system of claim 1, wherein the speed threshold is less than a speed limit of a road on which the vehicle is operating.

13. The system of claim 1, wherein the instructions include instructions to determine whether one or more of the second vehicles the first distance from the vehicle and in a same lane as the vehicle, are traveling below the speed threshold.

14. A method, comprising:
controlling, with a computer having a processor and a memory, at least one of a propulsion system or a steering system to operate a vehicle at a speed below a speed threshold;
determining whether a second vehicle a first distance from the vehicle is traveling below the speed threshold;
upon determining that the second vehicle is traveling below the speed threshold, continuing control of the steering system or the propulsion system with the computer; and
upon determining that the second vehicle is not traveling below the speed threshold, transitioning control of the steering system or the propulsion system to a human operator of the vehicle.

15. The method of claim 14, further comprising, upon determining that a third vehicle a second distance less than the first distance from the vehicle is not traveling below the speed threshold, controlling, with the computer, the steering system or the propulsion system to operate the vehicle at a speed above the speed threshold.

16. The method of claim 15, further comprising, upon determining that the speed of the vehicle has been above the speed threshold for a specified amount of time, transitioning control of the steering system of the propulsion system of the human operator of the vehicle.

17. The method of claim 14, further comprising determining that a third vehicle in front of the vehicle is traveling above the speed threshold before determining whether the second vehicle the first distance from the vehicle is traveling below the speed threshold.

18. The method of claim 14, further comprising determining that a third vehicle in front of the vehicle is out of a path of the vehicle before determining whether the second vehicle the first distance from the vehicle is traveling below the speed threshold.

19. The method of claim 14, further comprising determining whether the second vehicle the first distance from the vehicle is traveling below the speed threshold based on stored historical data.

20. The method of claim 14, further comprising determining whether the second vehicle the first distance from the vehicle is traveling below the speed threshold based on data received from a computer remote from the vehicle.

\* \* \* \* \*